May 28, 1957 W. A. JONES 2,794,149
CATHODE-RAY TUBE DEFLECTION SYSTEM
Filed Jan. 11, 1956
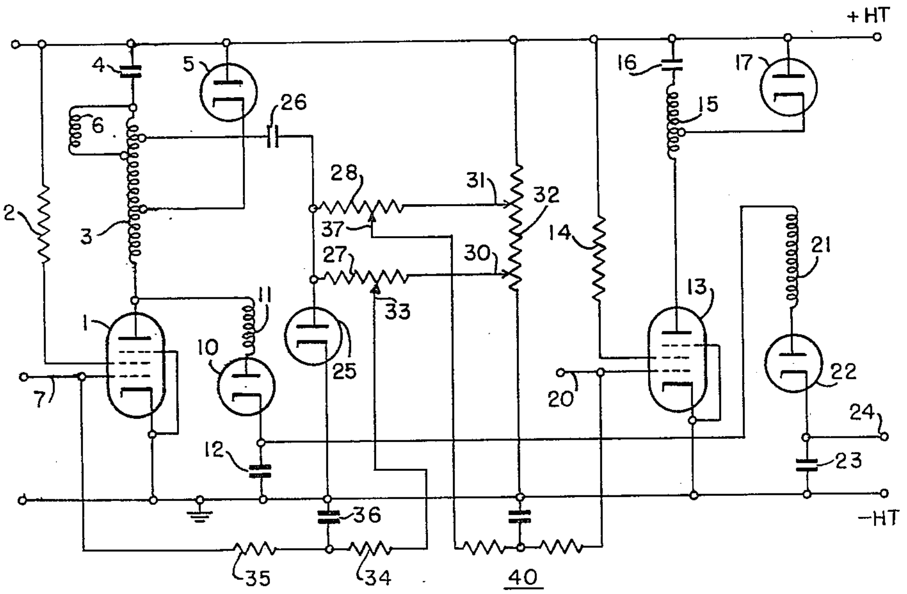

2,794,149

CATHODE-RAY TUBE DEFLECTION SYSTEM

William Alan Jones, Marple, England, assignor to Hazeltine Research, Inc., Chicago, Ill., a corporation of Illinois Application January 11, 1956, Serial No. 558,540

Claims priority, application Great Britain January 13, 1955

3 Claims. (Cl. 315—27)

This invention relates to television time base arrangements of the type provided with rectifying apparatus for deriving from energy released at each line flyback some at least of the high voltage—hereinafter referred to as the EHT voltage—for operating the associated picture or cathode-ray (C. R.) display tube. Such an arrangement will hereinafter be referred to as being of the type stated.

In arrangements of this kind it is known that variations of the C. R. tube beam current, such as occur owing to variations in the brightness of successive elemental areas of the picture, affect not only the value of the EHT voltage but also the amplitude of the line-scan current, since the energy for the EHT circuit is supplied by the line-scanning stage. If for example the beam current increases, more energy is supplied by the line-scanning stage to the EHT circuit; in consequence the amplitude of the line-scan current tends to fall and the width of the picture to decrease. Similarly when the beam current decreases: less energy is now supplied to the EHT circuit and so the scan-current amplitude tends to increase. In each case the dimensions of the picture tend to alter and the picture may go out of focus.

To some extent these effects are compensatory; for example, a fall in EHT voltage due to increased beam current tends to cause the width of the picture to increase, whereas the corresponding fall in the scan-current amplitude tends to cause the width of the picture to decrease; these two tendencies cancel each other to such an extent that where the picture is displayed on a C. R. tube screen of normal dimensions the changes of picture size are not easily discernible. It is however sometimes desirable to maintain a constant EHT and a constant scan-current amplitude in order to achieve a stable focus and dimensional accuracy.

Proposals have been made for stabilizing one or other of these factors—scan-current amplitude or EHT voltage—but each such arrangement has the disadvantage that variations of the unstabilized factor are no longer appreciably compensated.

An object of the present invention is to provide a TV time base arrangement of the type stated in which the values of both the line-scan current amplitude and the EHT voltage are maintained substantially constant.

In accordance with the present invention, a deflection system for use with a cathode-ray tube for supplying both a beam-deflection signal and a high voltage to the cathode-ray tube comprises circuit means for supplying a deflection control signal; first and second valve stages which are responsive to the deflection control signal for individually developing repetitive signals; circuit means coupled to the first stage for supplying a beam-deflection signal to the cathode-ray tube; first rectifying circuit means responsive to the repetitive signals of each of said valve stages to produce the high voltage which is supplied to the cathode-ray tube; second rectifying circuit means for developing first and second control signals by rectification of a portion of the repetitive signal developed by one of said stages; and means for applying these control signals to control the biases of the valves of the first and second stages, respectively, thereby to maintain constant both the amplitude of the beam-deflection signal and the high voltage which are supplied to the cathode-ray tube.

For a better understanding of the present invention, together with other and further objects thereof, reference is had to the following description taken in connection with the accompanying drawing, and its scope will be pointed out in the appended claims.

The accompanying drawing is a diagram of connections of one embodiment of the invention.

In carrying out the invention according to one form by way of example, see the accompanying drawing, a TV line time base arrangement includes a first tube stage having a first pentode tube 1 the cathode and suppressor grid of which are grounded and the screen grid of which is connected by way of a resistor 2 of 3.3 kilohms to the positive pole of a source of 200 volts the negative pole of which is grounded. The anode of the tube is connected to this pole by way of a transformer winding 3 and a 0.5 microfarad capacitor 4 in series, a tapping on the winding being connected to the cathode of a so-called "damper" diode 5 the anode of which is connected to the positive pole of the source. The scan coils 6 are coupled to winding 3 and arrangements are made for applying to the control grid of the tube over a lead 7 a driving voltage of wave form suitable for producing the line-scan current in the scan coils. The apparatus so far described operates as a line time base in the usual manner.

The first stage is also arranged to produce a part of the EHT voltage for the cathode-ray tube. For this purpose the anode of pentode 1 is connected to the anode of a first diode rectifier 10 by way of a transformer secondary winding 11 coupled magnetically to winding 3. The cathode of diode 10 is connected to ground by way of a 500 micromicrofarad capacitor 12. Secondary 11 is connected in such sense that in operation capacitor 12 is charged by the flyback voltage pulses, the electrode connected to the cathode of diode 10 being of course positive. A part of the EHT voltage is thus developed across capacitor 12.

The remaining part of the EHT voltage is developed by a second tube stage. This includes a second pentode tube 13 the cathode and suppressor grid of which are grounded and the screen grid connected by a 3.3 kilohm resistor 14 to the positive pole of the supply. The anode of the tube is connected to this pole by a combination of a transformer winding 15, a 0.5 microfarad capacitor 16, and a damper diode 17 similar to that of the first stage, except that no provision is here made for supplying a scan current. To the control grid of the tube is applied over a lead 20 the same driving voltage as is applied to pentode 1.

Magnetically coupled to winding 15 is a secondary winding 21. One end of this is connected to the cathode of the first diode rectifier 10 and the other end to the anode of a second diode rectifier 22 the cathode of which is connected to ground by way of a 2000 micromicrofarad capacitor 23. Secondary winding 21 is connected in such sense that in operation capacitor 23 is charged by positive-going pulses in synchronism with the line flyback pulses and generated by the second stage, which in this respect operates in a similar manner to the first stage.

The positive-going pulses appearing across secondary 21 are therefore added to the positive voltage existing across capacitor 12. Capacitor 23 thus becomes charged to a voltage equal to the sum of the two parts of the EHT voltage that are derived by the two stages separately. The voltage developed across capacitor 23 is applied over a lead 24 as the EHT voltage to the cathode-ray tube.

To develop control signals for the pentodes, rectifying means are provided in the form of a third diode rectifier 25 the anode of which is connected by way of a 500 micromicrofarad capacitor 26 to a suitable tapping on winding 3 of the first stage. The cathode of diode 25 is grounded. The load resistance of the rectifier circuit is formed by first and second 1-megohm resistors 27 and 28, respectively, one end of each of which is connected to the anode of diode 25 and the other ends to first and second sliders 30 and 31, respectively, on a 100 kilohm potentiometer 32 across the supply; this arrangement allows resistors 27 and 28 to be biased independently of each other.

From a slider 33 on resistor 27 a connection is made to the control grid of the first pentode 1 by way of a low-pass filter comprising two 470 kilohm resistors 34 and 35 in series the common point of which is grounded by a 0.01 microfarad capacitor 36. This filter tends to eliminate any ripple at the line-scan frequency. A slider 37 on resistor 28 is similarly connected by way of a filter network 40 to the control grid of the second pentode 13.

In operation, the anode of diode 25 remains at a potential of the order of 300 volts negative, this value being in part determined by the position on winding 3 of the tapping to which this anode is connected. One end (the left-hand end, as depicted) of each of resistors 27 and 28 is accordingly at this potential too. The potentials of the right-hand ends of the resistors are maintained positive by the potentiometer. Both the sliders 30 and 31 on this potentiometer are set near the ground end of the potentiometer, slider 31 being slightly more positive than the slider 30. Sliders 33 and 37 on resistors 27 and 28 are each set at potentials of about 50 volts negative.

The exact value of the anode potential of diode 25 rectifier varies with beam current. When for instance the beam current increases, and in consequence the first stage has to supply more energy to the EHT circuit, the amplitude of the line-scan current falls; the amplitude of the flyback pulses rectified by diode 25 also falls; and the anode potential of the diode becomes less negative, falling to, say, 298 volts. The bias applied by the first control signal (that derived from slider 33 of resistor 27) therefore becomes less negative and so the anode current of pentode 1 is increased, thereby tending to restore the amplitude of the line-scan current to its previous value. The setting of slider 30 on potentiometer 32 is so adjusted as to maintain substantially constant the amplitude of the line-scan current for varying values of the beam current.

If it were not for the second control signal, it will be appreciated that the restoration of the line-scan amplitude to its previous value would not be accompanied by a complete restoration of the EHT voltage to the level maintained before the increase in beam current caused it to fall. The effect of the second control signal, which similarly becomes less negative with increasing beam current, is to increase the anode current of pentode 13, thereby increasing the value of that part of the EHT voltage derived by the second stage. Slider 31 on the potentiometer is accordingly adjusted so that the change in this part of the EHT voltage just balances the opposite change in that part derived by the first stage so that the sum of the two parts, and hence the value of the EHT voltage applied to the CR tube, remain substantially constant despite beam-current variations.

As different biases are applied to load resistors 27 and 28 the two control signals change at different rates with change of beam current; that is to say, for a given change of beam current one control signal changes more than the other. The signal having the greater rate of change is that derived from the resistor that is more positively biased—namely, the second control signal. This difference in the rates of change is an important requirement in the arrangement as described, since the control signal for pentode 13 has to vary at a greater rate than the first control signal in order to maintain the EHT substantially level. The two rates may of course be adjusted by moving sliders 30 and 31, respectively, of the potentiometer.

Various details of the above-described arrangement may be varied within the scope of the invention. The EHT voltage developed by the two stages may for instance be some but not all of the EHT required, the remainder being supplied by a battery or other source or sources, which may include a further tube stage or stages controlled by an additional control signal or signals derived by the rectifying means for developing the first and second control signals. This rectifying means may be different from the arrangement described; in particular, the independent biasing of the two load resistors (where supplied) may be effected in other ways. Cases could occur where it may be desirable for the total EHT and/or the scan-current amplitude to decrease or increase to some predetermined extent with increasing beam current, rather than remain substantially constant; this can be achieved by adjustment of the various sliders, or by some slight modification of the circuit, of the arrangement above described.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A deflection system for use with a cathode-ray tube for supplying both a beam-deflection signal and a high voltage to the cathode-ray tube, the system comprising: circuit means for supplying a deflection control signal; first and second tube stages which are responsive to the deflection control signal for individually developing repetitive signals; circuit means coupled to the first stage for supplying a beam-deflection signal to the cathode-ray tube; first rectifying circuit means responsive to the repetitive signals of each of said tube stages to produce the high voltage which is supplied to the cathode-ray tube; second rectifying circuit means for developing first and second control signals by rectification of a portion of the repetitive signal developed by one of said stages; and means for applying these control signals to control the biases of the tubes of the first and second stages, respectively, thereby to maintain constant both the amplitude of the beam-deflection signal and the high voltage which are supplied to the cathode-ray tube.

2. A television system for supplying both a scanning current for deflecting the beam of the picture tube and a high voltage for energizing the beam, the system comprising: circuit means for supplying a driving voltage for producing scanning currents; first and second tube stages responsive to the driving voltage for individually developing output currents corresponding to the driving voltage; circuit means coupled to the first stage for supplying scanning current to the picture tube; first rectifying circuit means responsive to the output current in said stages to produce the said high voltage; second rectifying circuit means for developing first and second control signals by rectification of a portion of the output current developed in one of said stages; and means for applying these control signals to control the biases of the tubes of the first and second stages, respectively, thereby to maintain constant both the amplitude of said scanning currents and the high voltage which are supplied to the picture tube.

3. A television system for supplying both a scanning current for deflecting the beam of the picture tube and a high voltage for energizing the beam, the system comprising: circuit means for supplying a driving voltage for producing line-scanning currents; first and second tube stages responsive to the driving voltage for individually developing output currents corresponding to the driving voltage; circuit means coupled to the first stage for supplying line-scanning current to the picture tube; first rectifying circuit means responsive to the output current in said stages to produce the said high voltage; second rectifying circuit means for developing first and second control signals by rectification of a portion of the output current developed in one of said stages; and means for applying these control signals to control the biases of the tubes of the first and second stages; respectively, thereby to maintain constant both the amplitude of said scanning currents and the high voltage which are supplied to the picture tube.

No references cited.